Oct. 10, 1967     G. R. SJÖBERG     3,346,093
DEVICE FOR LATERALLY TRANSFERRING CIGARS OR THE
LIKE FROM ONE CONVEYING MEANS TO ANOTHER
Filed Oct. 7, 1966

3,346,093
DEVICE FOR LATERALLY TRANSFERRING CIGARS OR THE LIKE FROM ONE CONVEYING MEANS TO ANOTHER

Goran R. Sjöberg, Jakobsberg, Sweden, assignor to Arenco Aktiebolag, Stockholm-Vallingby, Sweden
Filed Oct. 7, 1966, Ser. No. 585,198
Claims priority, application Sweden, Apr. 21, 1966, 5,456/66
1 Claim. (Cl. 198—22)

ABSTRACT OF THE DISCLOSURE

A device for laterally transferring cigars or cigarettes from a conveyor surface on which they are moved in their longitudinal direction is provided with a driven roller above and parallel to the conveying surface with the space between the roller and the surface less than the diameter of the cigars or cigarettes. The axis of the roller is inclined relative to the longitudinal direction of movement and the roller rotates in such a direction that a cigar or cigarette engaged by the roller is rotated at the same time it is transferred laterally and longitudinally. Means are provided for adjusting the angle between the roller axis and the longitudinal direction.

---

The invention relates to a device for laterally transferring cigars, cigarettes or similar tobacco products from a conveyor on which the products are being transported longitudinally.

Turning or rotation of the cigars is necessary or desirable when the adhesive which gives fast the binders or wrappers of the cigars has not dried and the cigars are to be transferred from the conveyor to a slide face or the like. When cigars are transferred to the slide face, some of the adhesive always sticks to the slide face and despite repeated cleaning operations the risk of a cigar sticking to the face is always imminent if it is not rotated about its longitudinal axis, in such a direction that rolling along the slide face is facilitated. The prior known devices for transferring cigars are not capable of rotating the cigars at the same time they are transferred.

This invention provides a device which enables cigars or the like to be transferred laterally from a conveying means, the cigars being rotated simultaneously as they are transferred laterally and in the original direction of movement.

The invention is illustrated by an embodiment according to the accompanying drawing on which:

Figure 1:
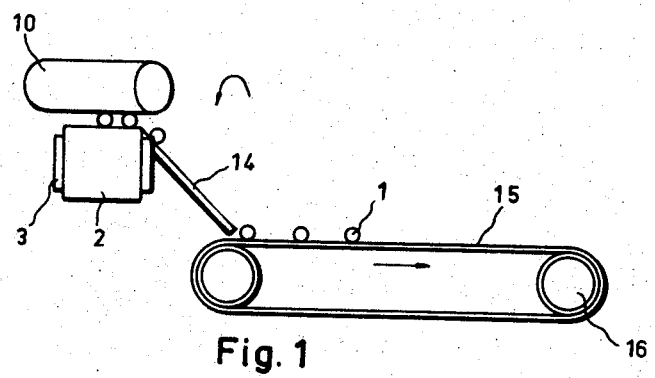
FIG. 1 is a simplified drawing of the device viewed from the side.
Figure 2:
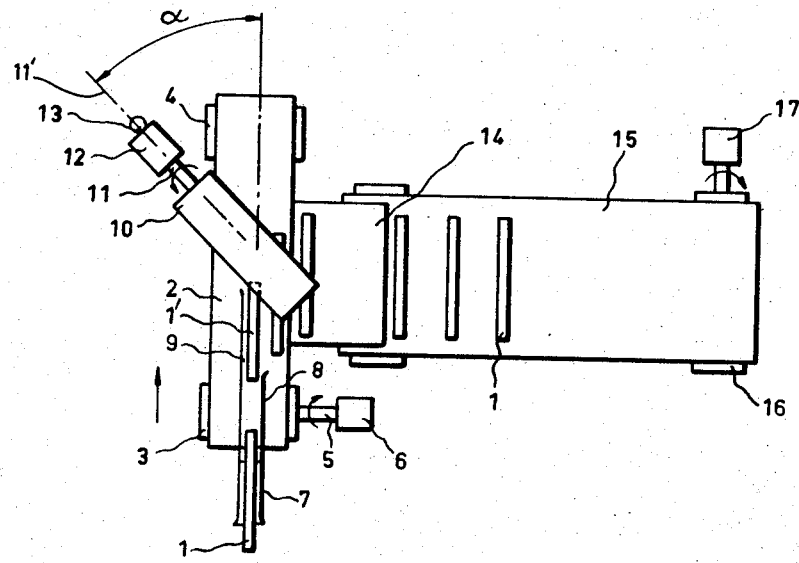
FIG. 2 is a simplified drawing of the device viewed from the top.

Illustrated in the drawing are cigars or cigarettes 1 which are fed onto a conveying means, comprising an endless belt 2 passing over rollers 3 and 4. The roller 3 is driven via a shaft 5 from a motor 6 in the direction indicated by the arrows. The cigars 1 are transferred to the belt 2, forming a conveying surface, in a suitable manner, for instance as shown in FIG. 2, by means of a chute 7 provided with side bars 8 and 9 between which the cigars 1 are conveyed by the belt 2 towards and under a roller 10, obliquely positioned relative to the direction of movement of the belt 2. In the shown example the roller 10 is supported by shaft 11 of a drive motor 12, which shaft 11 and roller 10 are parallel to the cigar supporting surface of belt 2, whereby the roller 10 rotates about its axis of rotation 11' in the direction indicated by an arrow in FIG. 2. The shortest distance between the roller 10 and the carrier surface of the belt 2 is somewhat smaller than the diameter of the cigars 1 or cigarettes which are fed onto the belt, whereby the front end of the cigar 1' in FIG. 2 will be engaged by the roller 10 when said cigar occupies the position shown in FIG. 2.

As soon as the end of the cigar 1' has contacted the roller 10 the cigar is imparted a laterally-directed movement in addition to a forward movement in the original conveying direction, this being due to the fact that the roller 10 forms an angle α with the longitudinal direction of the cigar. To permit the cigar 1' to be moved laterally the right hand guide bar 8 terminates at the rear end of the cigar in the position where the front end of the cigar has reached the roller 10. The ratio between the axial movement of the cigar and its lateral movement is determined firstly by the angle α and secondly by speed of the roller 10. To enable lateral movement of the cigars to be determined as desired the motor 12, and thereby also the roller 10, is pivotally mounted on a shaft 13 and the speed of the motor 12 can be regulated by means of suitable devices (not shown). It is obvious that the component of movement for a cigar increases with increasing speed of the motor 12 and reduced angle.

The cigars 1 are fed from the belt 2 onto an inclined plane 14 on which they roll, for instance, into a container or onto a conventional type conveyor belt 15, as shown in the drawing, the driving roller 16 of said conveyor belt 15 being driven by a motor 17 in the direction shown. Because the roller 10 imparts a rotary movement to the cigars, or other tobacco products, these products roll onto the plane 14 and the risk of said products sticking or being retarded so that they fall askew due to presence of adhesive on the plane 14 is completely eliminated. Furthermore should cigars fall from the inclined plane 14 down into a container, there is no risk that they will not lie parallel to each other.

In the described embodiment only a portion of the cigars abuts the roller 10, but if desired linear abutment can also be provided for. In this connection, for instance, the roller 10 can form the bearing roller of an endless belt (not shown) trained to run over a second roller.

The arrangement is not restricted to the specific embodiment disclosed but can be varied arbitrarily within the scope of the inventive idea.

What I claim is:

A device for laterally transferring cigars or cigarettes from a conveyor surface on which the cigars are transported in their longitudinal direction, comprising a driven roller arranged above and substantially parallel with said conveying surface, the shortest distance of said roller from said conveying surface being less than the diameter of the cigars and the axis of rotation of said roller being inclined relative to said longitudinal direction, driving means for driving the roller in such a direction that a cigar conveyed up to and in contact with the roller is engaged by said roller and imparted a rotary movement at the same time as it is transferred laterally and longitudinally, and means for adjusting the angle between said axis of rotation of the roller and said longitudinal direction.

References Cited
UNITED STATES PATENTS
2,109,148 2/1938 Gwinn _____ 198—20
3,286,813 11/1966 Fuhrimann _____ 198—165 X

FOREIGN PATENTS
744,461 5/1957 Great Britain.

EDWARD A. SROKA, *Primary Examiner.*